3,600,231
MERCURY CELL
Robert J. Dawson, Madison, Wis., assignor to
ESB Incorporated
No Drawing. Filed Nov. 28, 1969, Ser. No. 880,947
Int. Cl. H01m 15/06
U.S. Cl. 136—111
6 Claims

ABSTRACT OF THE DISCLOSURE

A mercury cell is described having additives in the mercuric depolarizer mix which have the effect of stabilizing the open circuit voltage and inhibiting agglomeration of mercury in the depolarizer mix. The preferred additive is $Mn_2O_3$ although $Mn_3O_4$ has been found to be satisfactory. The additive is mixed with the depolarizer mix in amounts ranging from at least about 1% by weight of the mix to a maximum percentage consistent with capacity and volume requirements.

BACKGROUND OF THE INVENTION

Since its commercial introduction, the alkaline mercuric oxide-zinc system has met with substantial success in providing a reliable button-type cell commonly called a mercury cell. In particular, the cell has been useful in hearing aids, photographic equipment, and other devices requiring small cells. The smaller electronic devices in which such cells are used normally require a rather steady potential and a cell which has a significant voltage instability is clearly not desirable. However, commercially available mercury cells do have a certain voltage instability which is caused by problems associated with the mercuric depolarizer mix.

Some of the problems referred to above include excessive electrolyte absorption by the depolarizer mix wherein the mix becomes saturated and no longer functions properly. This excessive absorption of electrolyte displaces air in the mix which causes air bubbles to form inside the cell. These air bubbles tend to be trapped in the area of the barrier which is interposed between the cell electrodes, and these trapped air bubbles increase the internal impedance of the cell. In addition, during discharge of the cell the depolarizer mix is reduced to mercury which tends to agglomerate in the form of beads. These mercury beads can break through the barrier to contact the zinc electrodes and short-circuit the cell. A factor which contributes to this agglomeration of the mercury is the volume increase of the zinc pellet during discharge of the cell which exerts a pressure against the barrier and depolarizer mix.

Some corrective measures taken to overcome the above problems include placing the depolarizer mix into the cell under high pressure, pre-wetting the positive mix with electrolyte, adding a plastic binder to the depolarizer mix to minimize electrolyte absorption while also giving structural strength and finally, adding $MnO_2$ which aids in preventing agglomeration of the mix while also giving structural support thereto. Although some of these corrective actions have overcome the problems at which they are aimed, nevertheless, in some instances they have caused additional problems. For example, the addition of the plastic binder has been found to increase the cell impedance, while the addition of the $MnO_2$ has raised the cell potential to the characteristic potential of $MnO_2$ which in many applications is undesirable.

This invention relates to overcoming the disadvantages of the conventional mercury cell and providing a cell with a stable open circuit voltage together with other desirable features.

SUMMARY OF THE INVENTION

The general purpose of this invention is to eliminate as much as possible the undesirable features of the mercury cell in use today, including low and unstable open circuit voltage and agglomeration of the mercury mix which occurs on discharge and contributes to internal shorting of the cell. It is also an object of the invention to provide an additive which will form a matrix to entrap the mercury globules and tend to resist the pressure exerted against the depolarizer mix by the increased volume of the anode discharge product. In this manner, agglomeration of the mercury is inhibited.

A further purpose of the invention is to stabilize the cell potential so that it remains relatively constant over a long period of time. This is necessary since many devices in which mercury cells are used require steady cell potentials.

Another object of the invention is to provide an inexpensive additive to the mercury mix which can be easily incorporated into a conventional cell.

The additives of this invention are $Mn_2O_3$ and $Mn_3O_4$ which are both effective, although the $Mn_2O_3$ appears to be more effective. A mercury cell having an additive in accordance with this invention incorporated in the depolarizer mix has been shown to provide a stable open circuit potential and to inhibit agglomeration of the mercury.

DESCRIPTION OF THE PREFERRED EMBODIMENT

The basic elements of a mercury cell include a cathode cup containing a mercuric oxide depolarizer mix, a zinc anode pellet with a barrier material placed between the pellet and the depolarizer mix, an electrolyte absorbent material between the zinc pellet and the barrier, an alkaline electrolyte, an anode cup which surrounds the zinc pellet and mates with the cathode cup, and a means to seal the cups which is normally provided by an insulating grommet or washer. Usually a small amount of graphite is included in the depolarizer mix to improve its conductivity.

A cell in accordance with this invention has a metallic cathode cup which preferably is made of nickel-plated steel. Pressed into this cup is the mercuric oxide depolarized mix which comprises mercuric oxide with minor amounts of graphite and a polystyrene binder. The depolarizer mix also contains the $Mn_2O_3$ or $Mn_3O_4$ additive to stabilize the open circuit potential. A woven nylon material with an ion exchange resin therein acts as a barrier between the depolarizer mix and the zinc pellet, and in addition, an electrolyte absorbent material is placed between the zinc pellet and the barrier. This absorbent material preferably is a non-woven matted cellulosic such as cotton fibers. The anode cup then covers the zinc pellet and is sealed to the cathode cup by means of an insulating grommet molded to the edge of the anode cup, and the cathode cup is crimped upon the insulating grommet to form a sealed cell.

Prior to placing the mercuric oxide depolarizer mix in the cell, the mix may be pre-wetted with alkaline electrolyte. As noted earlier, this pre-wetting of the depolarizer mix aids in inhibiting excessive electrolyte absorption by the mix. The use of a hydrophobic plastic binder such as polystyrene is also quite helpful in giving structural support to the mix as well as preventing excessive absorption of electrolyte. Other suitable binders include polytetrafluoroethylene emulsions, polyethylene and the like. Although the particular cell described herein does not have $MnO_2$ added to the depolarizer mix, it is known that mercury cells designed for use in hearing aids may contain $MnO_2$ in the depolarizer mix, and this invention is equally applicable to such cells. In fact, the additive of this invention can readily be used in all types of conventional mercury cells.

The $Mn_2O_3$ and $Mn_3O_4$ additives of this invention are incorporated into the mercuric oxide depolarizer mix in amounts ranging from at least about 1% by weight of the depolarizer mix to a maximum percentage consistent with capacity and volume requirements of the cell. In general, incorporation of the additive in amounts ranging from about 10 to about 25% by weight of the depolarizer mix is satisfactory for most mercury cell applications. The depolarizer mix may also contain from about 0.5 to about 2% by weight of a hydrophobic plastic binder.

EXAMPLE

A series of cells were made according to this invention using various amounts of $Mn_2O_3$ in the depolarizer mix. In all series, the test cells were negative limited and contained the same amount of negative active material. The additive was mixed with the mercuric oxide depolarizer mix having a small amount of graphite therein. In some instances a polystyrene binder was added to the mix while other cells were made without the binder. The test cells were constructed without the nylon barrier between the electrodes to demonstrate the effect of the additives. The final mixture of depolarizer mix and additive was then pressed into the proper shape and pressed into the cathode cup.

Below are listed series of 625 size cells having the components shown in the depolarizer mix. These test cells were subjected to open circuit voltage and capacity tests. The quantities of the components of the depolarizer mix are given in terms of parts by weight of the mix.

| | Parts by weight | | | |
|---|---|---|---|---|
| | HgO | $Mn_2O_3$ | Graphite | Binder |
| Series: | | | | |
| A | 95 | 0 | 5 | 0 |
| B | 95 | 0 | 5 | ½ |
| C | 95 | 0 | 5 | 1 |
| D | 85 | 10 | 5 | 0 |
| E | 85 | 10 | 5 | ½ |
| F | 85 | 10 | 5 | 1 |
| G | 75 | 20 | 5 | 0 |
| H | 75 | 20 | 5 | ½ |
| I | 75 | 20 | 5 | 1 |

The cells were tested on a 1000 ohms/volt voltmeter over a period of time as shown in the table. Capacity measurements were taken after three weeks storage at room temperature. The capacity was measured in terms of hours elapsed before the cell voltage reached 0.9 v.

TABLE

| | Open circuit voltage (days) | | | Capacity hours, 0.9 v. |
|---|---|---|---|---|
| | 0 | 7 | 14 | |
| Cell series: | | | | |
| A | 1.320 | 1.320 | 1.320 | 290 |
| B | 1.304 | 1.298 | 1.296 | 320 |
| C | 1.298 | 1.285 | 1.284 | 252 |
| D | 1.335 | 1.335 | 1.335 | 482 |
| E | 1.334 | 1.335 | 1.332 | 500 |
| F | 1.328 | 1.330 | 1.330 | 420 |
| G | 1.335 | 1.335 | 1.335 | 502 |
| H | 1.335 | 1.336 | 1.340 | 505 |
| I | 1.333 | 1.335 | 1.335 | 500 |

The above table clearly illustrates the greatly improved open circuit voltage stability provided by the $Mn_2O_3$ in cells having a binder, and the improved capacity in all cells provided by incorporating $Mn_2O_3$ in the mercuric oxide depolarizer. Other part-by-weight variations of the components in the depolarizer mix were tested with corresponding improvements in the open circuit voltages and capacities. The quantity of $Mn_2O_3$ or $Mn_3O_4$ added to the depolarizer mix affects the cell capacity, and consequently, the capacity requirement of the cell is an important factor in determining the amount of additive to be included in the depolarizer mix.

The teaching of this invention is applicable to the variety of conventional mercury cells and includes within its scope all modifications apparent to those skilled in the art.

What I claim is:

1. In an electric current producing cell comprising an anode, an alkaline electrolyte, and a mercuric oxide depolarizer mix, the improvement which comprises adding to said depolarizer mix an additive selected from the group consisting of $Mn_2O_3$ and $Mn_3O_4$, said additive being present in an amount of at least about 1% by weight of said depolarizer mix.

2. A cell in accordance with claim 1 in which said additive is $Mn_2O_3$.

3. A cell in accordance with claim 1 in which said additive is present in an amount ranging from about 10 to about 25% by weight of the depolarizer mix.

4. A cell in accordance with claim 1 in which the anode consists essentially of zinc active material and the depolarizer mix contains from about 0.5% to about 2% by weight of hydrophobic plastic binder.

5. A cell in accordance with claim 2 in which the $Mn_2O_3$ is present in an amount ranging from about 10 to about 25% by weight of the depolarizer mix.

6. A cell in accordance with claim 4 in which the hydrophobic plastic binder is polystyrene.

References Cited

UNITED STATES PATENTS

| 1,098,606 | 6/1914 | Achenbach | 136—138 |
| 1,434,469 | 11/1922 | Wilker | 136—138 |
| 3,024,297 | 3/1962 | Urry | 136—139 |
| 3,053,701 | 9/1962 | Urry et al. | 136—139 |

DONALD L. WALTON, Primary Examiner

U.S. Cl. X.R.

136—137, 138